United States Patent [19]

Bompard et al.

[11] Patent Number: 5,021,281

[45] Date of Patent: Jun. 4, 1991

[54] LAMINATED MATERIAL REINFORCED BY A MULTI-DIMENSIONAL TEXTILE STRUCTURE AND METHOD FOR PRODUCING THE SAME

[75] Inventors: Bruno Bompard, Lyons; Jean-Paul Lamarie, Caluire, both of France

[73] Assignee: Brochier S.A., Cedex, France

[21] Appl. No.: 77,643

[22] Filed: Jul. 24, 1987

[30] Foreign Application Priority Data

Aug. 1, 1986 [FR] France .................................. 86 11214

[51] Int. Cl.$^5$ .................................................. B32B 3/12
[52] U.S. Cl. ...................................... 428/116; 428/223; 428/257; 428/258; 428/259; 428/408; 428/982; 428/920
[58] Field of Search ............... 428/223, 225, 257, 258, 428/259, 920, 408, 902, 116

[56] References Cited

U.S. PATENT DOCUMENTS

| | | | |
|---|---|---|---|
| 2,206,698 | 7/1940 | Hendley | 139/384 |
| 3,670,504 | 6/1972 | Hayes et al. | 61/3 |
| 3,965,942 | 6/1976 | Hatch | 428/116 |
| 4,379,798 | 4/1983 | Palmer et al. | 428/257 |
| 4,389,447 | 6/1983 | Disselbeck et al. | 428/223 |
| 4,671,470 | 6/1987 | Jonas | 428/116 |
| 4,686,134 | 8/1987 | Ono | 428/225 |

*Primary Examiner*—James J. Bell
*Attorney, Agent, or Firm*—Wenderoth, Lind & Ponack

[57] ABSTRACT

A laminated material having a cross section comprising a core and at least one lateral wing, for example a cross section in the form of an I, T, J, $\Omega$ or the like is provided as a result of the impregnation of a reinforcing textile structure and the hardening of the assembly. The textile structure includes two woven laps spaced from one another and a connecting lap extending between the two laps. The material is characterized in that the connecting lap consists of at least one lap of warp binding threads trapped between the weft threads of the two woven laps.

32 Claims, 5 Drawing Sheets

LAMINATED MATERIAL REINFORCED BY A MULTI-DIMENSIONAL TEXTILE STRUCTURE AND METHOD FOR PRODUCING THE SAME

BACKGROUND OF INVENTION

The invention relates to new laminated materials reinforced by a multi-dimensional structure or fabric; it also relates to the means, particularly a weaving loom, which is specially designed for the production of such a structure.

Laminated materials have been known for a very long time and are formed by superimposed layers of textile materials (fabrics, non-woven, etc. which are impregnated with resin, the assembly undergoing heat treatment, in order to cause the polymerization of the said resin and the hardening of the assembly.

These materials have had many uses, either in the form of planar elements (sheets) or in the form of shaped elements obtained by molding, particularly in the building, automobile, shipping and aeronautical industries.

Hitherto, most laminated materials have been obtained by superposing a plurality of textile layers impregnated with prepolymerized resin. The textile materials used are either laps formed from parallel threads or woven threads. The materials used in such laps are, for example, filaments of glass, graphite, boron, aramide and carbon, or mixtures thereof.

There has also been a proposal to produce textile elements in a form making it possible to obtain laminates having cross sections in the form of I, J, T, Ω, etc. Such materials are usually obtained by superposing a suitable number of textile laps, preferably by interlacing them on a template making it possible to obtain the desired form. Such a superposition of the various layers, which hitherto has been carried out manually, is lengthy and costly and, above all, gives rise to the possibility of errors, since the operator may make a mistake in the number of superposed layers and/or in the orientation of the various layers relative to one another. Consequently, there is a risk of delamination in these materials, and their resistance to shocks is sometimes inadequate.

To overcome this disadvantage, many solutions have been proposed in order to obtain woven or non-woven materials having various forms, these materials subsequently being impregnated with a resin. Such materials having a complex form are intended, above all, to have good acoustic characteristics and to not exhibit a high mechanical performance allowing them to be used as structural pieces.

Thus, for example, U.S. Pat. No. 3,481,427 describes a three-dimensional fabric based on glass filaments, which, after being impregnated with a resin and after polymerization, provides a rigid porous panel having very good acoustic properties. According to this document, it is possible, in a single operation, to weave a "sandwich"-type material, one face of which is porous, while the other face is continuous, these two faces being connected to one another by means of grooves. Such a woven material is not intended to have high resistance, its function being, above all, to ensure good sound absorption.

U.S. Pat. No. 3,700,067 likewise describes a three-dimensional porous fabric which also makes it possible to effect good sound absorption.

U.S. Pat. No. 3,670,504 describes a textile structure, in which concrete can be poured and which can serve for undersea construction work (for example, the structure can be filled with sand and other natural materials). The structure comprises two woven laps which are spaced from one another and through which pass threads interlaced in the laps. These threads are advantageously arranged in parallel rows, to give the structure strength and retain the above-mentioned materials. The textile materials forming such a structure are selected to withstand water and, in particular, are polypropylene or "Nylon". The textile structure described in U.S. Pat. No. 3,670,504 is a three-dimensional porous fabric which is suitable for the uses intended in this patent, but which would not be suitable for producing laminated materials with high mechanical resistance.

U.S. Pat. No. 2,206,698 disclosed blinds comprising two woven bands connected by means of a type of spacer passing through the wefts of the said bands in the manner of a chain. Such an article cannot be compared with a three-dimensional structure intended for the reinforcement of laminated materials.

It has also been proposed in French Patent No. 2,319,727 to produce three-dimensional fabrics making it possible to obtain laminates having a high mechanical resistance and good resistance to shocks and to abrasion. However, the method described in this document makes it possible to obtain blocks which, although capable of being produced in any form, are not three-dimensional textile elements which can be produced continuously on a conventional weaving loom.

As indicated in the introduction of French Patent No. 2,315,562, it was also proposed to produce thick three-dimensional fabrics from a bidirectional cloth obtained by means of a conventional weaving process and comprising warp threads and weft threads, and to entangle a third series of threads with this fabric so formed, in a different direction from the warp and weft directions, by means of a weaving machine or a suitably adapted loom.

In such an embodiment, because the warp and weft threads are interlaced, it is virtually impossible to use fragile fibers, such as carbon or graphite fibers.

Recently, FR-A-2,497,839 proposed a solution making it possible to produce very long shaped elements having, for example, a cross section in the form of an I, T, J, etc. directly on a weaving loom. Such a fabric has a structure of the type illustrated in FIG. 1 and, for example, if it is desired to produce I-shaped material, is composed of a central zone (1) subdivided, on each of its sides into two elementary laps (2, 3, 4, 5). The laps of warp and weft threads forming the central part (1) are bound by means of warp binding threads extending over the entire thickness of the material, while the elementary laps (2, 3, 4 and 5) are bound in the same way by means of additional binding warps. This material, when produced on the loom, takes the form illustrated in FIG. 1, and during its shaping into the form of an I, the elementary parts (2, 3, 4, 5) are folded back laterally, the central part (1) thus forming the branch of the I.

It will be seen that, in such an embodiment, the central part (1) is at least twice as thick as the lateral parts (2, 3, 4, 5), and moreover that, with respect to a weaving width (L), the relative widths of the central part (1) and of the lateral parts (2, 3, 4, 5) are admittedly selectable, as required, but the sum of these widths will always correspond to the weaving width.

Furthermore, in view of their final use, these elements have to be reinforced, essentially in the central part, by means of fabrics of the oblique type, in order to impart properties associated with torsional resistance to these elements.

SUMMARY OF THE INVENTION

According to the present invention, a laminated material exhibiting high mechanical resistance, having a cross section defined by a core and at least one lateral wing, for example a cross section in the form of I, T, J, Ω and the like, is provided as a result of the impregnation of a textile reinforcing structure and the hardening of the assembly, the said textile structure of comprising two woven laps A, B spaced from one another and a connecting lap C extending between the two laps A, B, and the said connecting lap C consisting of at least one lap of warp binding threads trapped between the weft threads of the two woven laps A, B.

The threads of the warp binding lap can extend either at right angles to the woven laps or preferably can be inclined relative to the same, or can both extend at right angles and be inclined.

The warp threads and the weft threads forming the two fabrics and the threads of the warp binding lap can be based on the same material or on different textile materials.

The textile threads and fibers are industrial threads and fibers currently used in laminates and having high mechanical resistance and/or high fire resistance, for example glass, graphite, carbon, aramide and boron, or mixtures thereof.

It is also possible to use fibers and threads of different types, for example mixtures of filaments exhibiting high mechanical resistance, such as carbon threads, with high-temperature thermoplastic filaments, such as polyarylene sulfide filaments, for example polyphenylene sulfide filaments.

Likewise, threads comprising a core exhibiting high mechanical resistance, and impregnated or covered with a thermoplastic resin, can be at least partially used. These threads are based, for example, on carbon or aramide. The covering is preferably polyamide.

It can therefore be advantageous if the threads and fibers of the textile structure contain a sufficient quantity of resins or polymers for producing the final laminated article. Thus, before the preparation of the composite material, the threads or fibers can be impregnated with resins capable of cold or hot reaction, such as epoxy resins, bismaleimide resins, phenolic resins and other similar resins. As mentioned above, the threads and fibers used during weaving can comprise mixtures of filaments, some having technical characteristics and a sufficient quantity of others having high-temperature thermoplastic properties.

It will therefore be seen that the method for producing the laminated materials according to the invention can differ according to the type of threads and fibers used. In some cases, a conventional production method can be used involving first weaving the structure, then impregnating it with resin and finally shaping the final article, particularly by means of heating under pressure or in a vacuum.

However, it is also possible to directly prepare a structure suitable for final shaping, by ensuring that the threads or fibers used for weaving already have the quantity of polymer necessary for final shaping, the quantity of polymer can be made as a result of mixing with thermoplastic threads or impregnation of the industrial fibers. In such cases, the textile structure can be converted directly into structural elements of high mechanical resistance, particularly by means of heating under pressure or in a vacuum.

It will also be noted that, according to an alternative embodiment, it is possible to reinforce the textile structure, especially the binding lap, by inserting reinforcing threads, particularly hot-melting threads, in the latter, thus making it possible to give the textile structure satisfactory dimensional stability and mechanical strength, before impregnation with resin and conversion into a laminate, and the hot-melting threads can then be eliminated during heating.

A multi-dimensional fabric, such as that used in the laminates according to the invention, can comprise one or more laps of warp binding threads. And when there are several laps, the laps these can be spaced from one another so as to form longitudinal channels or, if they are joined together, to form a thicker central part.

According to a variant, it is possible to have a lap of warp binding threads present in the form of bands spaced from one another in the length of the weaving.

Of course, the outer fabrics can either have the same width or have different widths.

The advantage of such a multi-dimensional structure is not only that it can be produced directly on the loom over the entire width (L) of the latter, but also that the inclination of the warp binding threads can be varied as desired.

After weaving, such a structure can be cut to the desired length, and if appropriate, associated with other reinforcing elements and impregnated with a conventional resin, for example an epoxy resin.

To obtain the textile structure used for the reinforcement of laminated materials, the two laps are weaved by a method known per se and are arranged spaced from one another and so as to correspond to the shape of the desired article, the two spaced laps being connected by means of at least one additional lap which is produced by passing a set of warp threads between the weft threads of the said spaced laps.

For this purpose, a loom which is also part of the invention can be used, this loom being characterized in that:

its comb is moved parallel to the normal plane of the warp threads;

downstream of the comb is arranged a template, the form of which corresponds to the form of the fabric to be produced (T, H, etc.), this template having means for advancing the laps of spaced fabrics.

BRIEF DESCRIPTION OF THE DRAWINGS

The invention and the advantages which it affords will be illustrated further by preferred but not-limitative embodiments described below and illustrated in the accompanying drawings in which.

THE PREFERRED EMBODIMENTS

In the following description, the same reference will be used to designate the same elements throughout.

Figure 1:
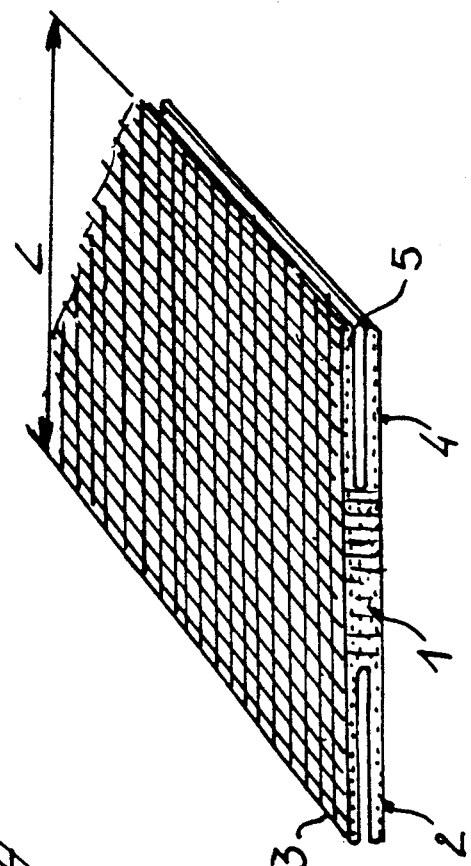
FIG. 1 illustrates a three-dimensional fabric produced according to the prior art (FR-A-2,497,839)
Figure 2:
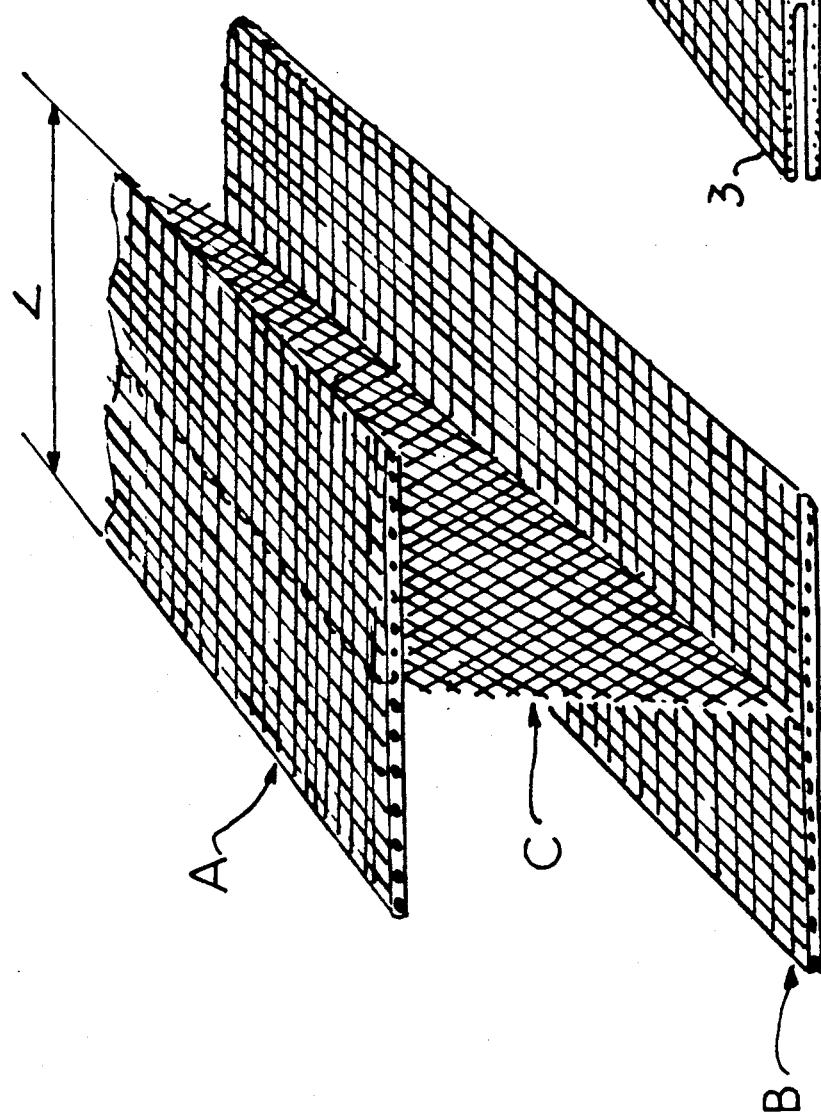
FIG. 2 is a perspective view showing the structure of a multi-dimensional textile article woven according to the invention.
Figure 3:
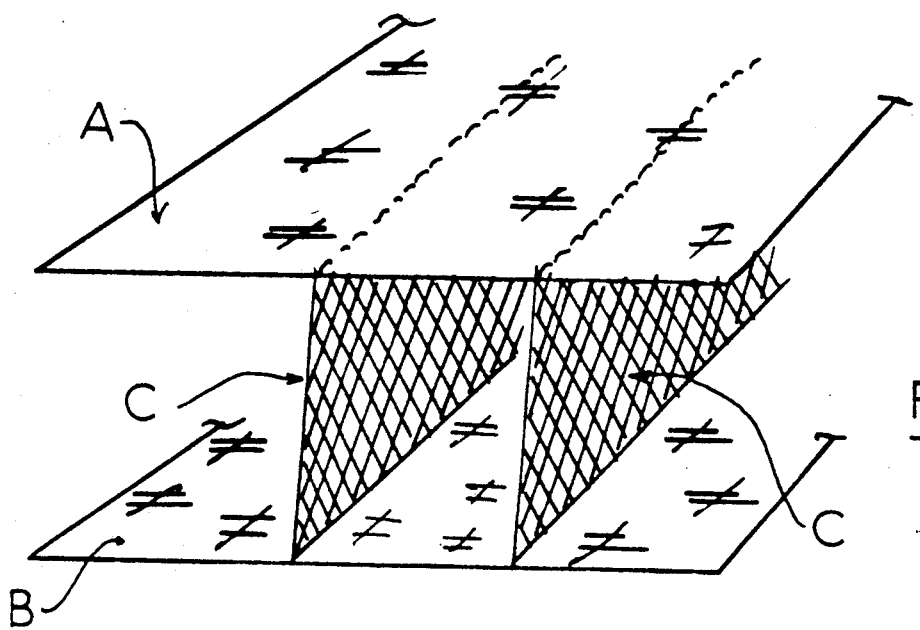
FIGS. 3, 4, 5, 6 and 7 are likewise perspective views showing different alternative structures of a multi-dimensional textile article woven according to the invention.
Figure 4:
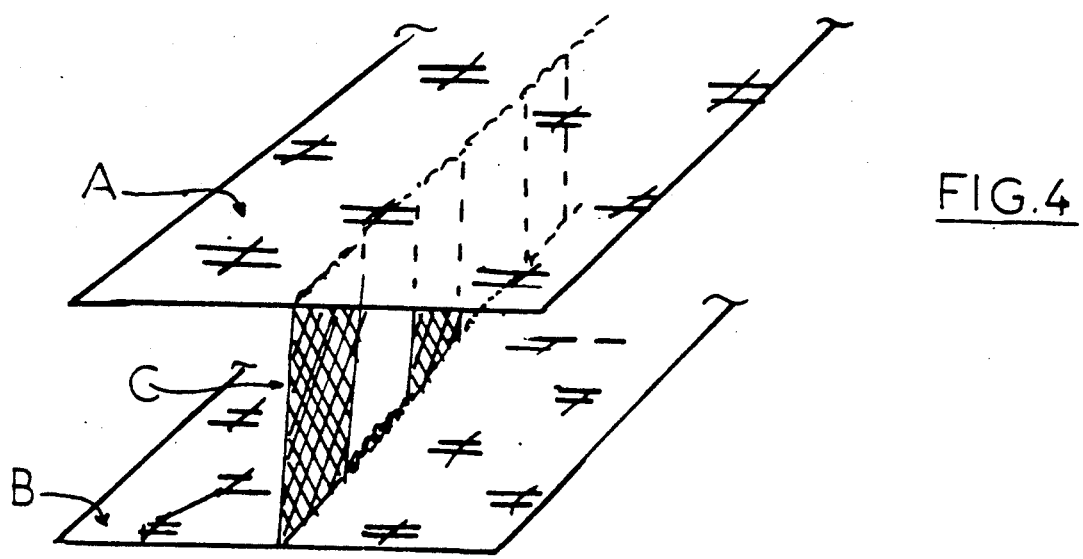
Figure 5:
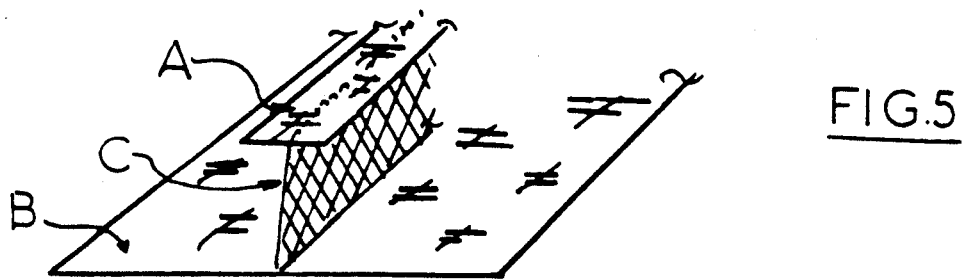

Referring to FIG. 2, the multi-dimensional woven textile structure, according to the invention for producing laminated materials, consists essentially of two preferably multi-layer bidirectional fabrics A, B spaced from one another and a connecting part C.

Figure 8:
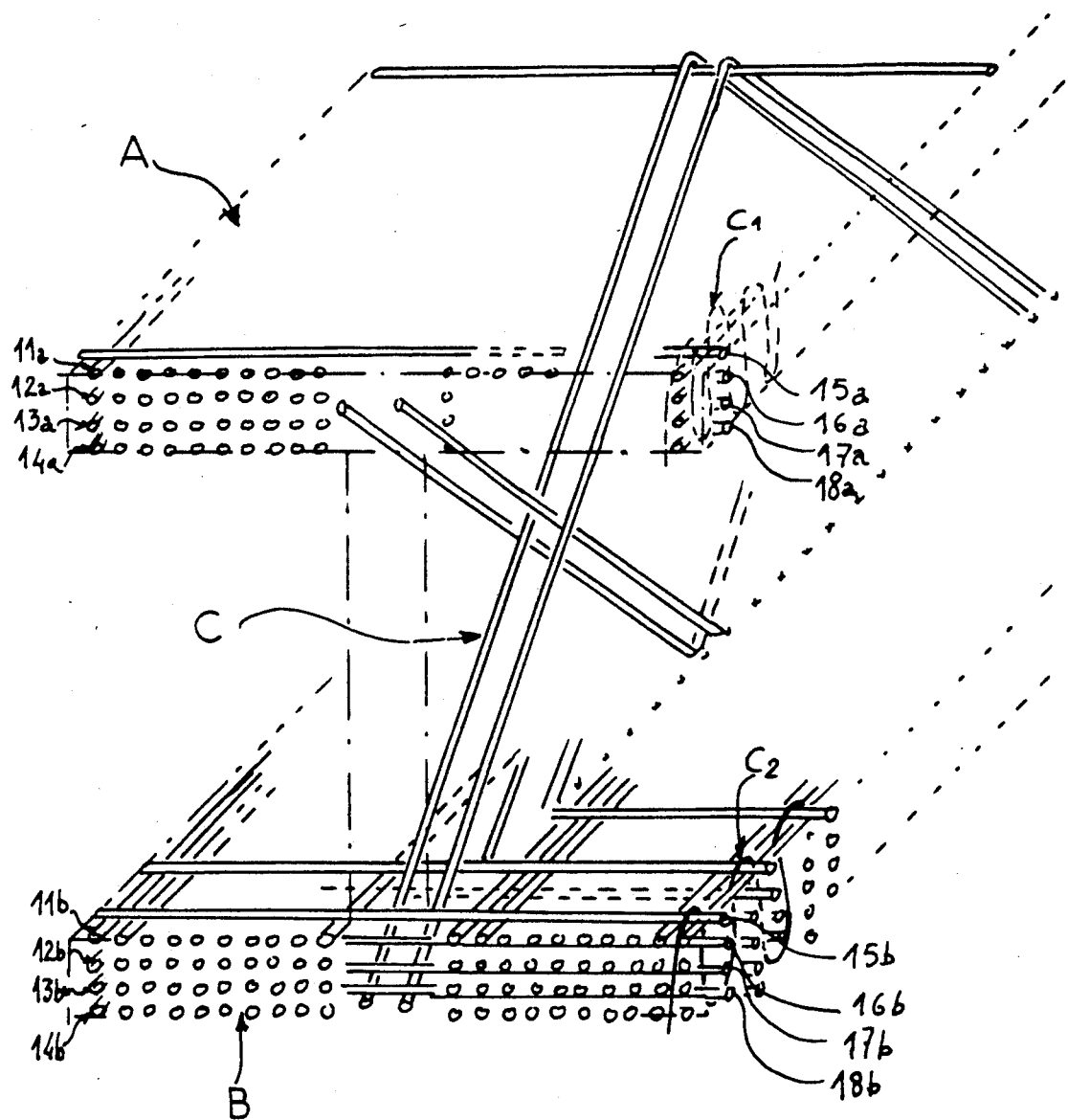
FIG. 8 is a detailed view illustrating the structure of an I-shaped multi-dimensional fabric produced according to the invention.
Figure 9:
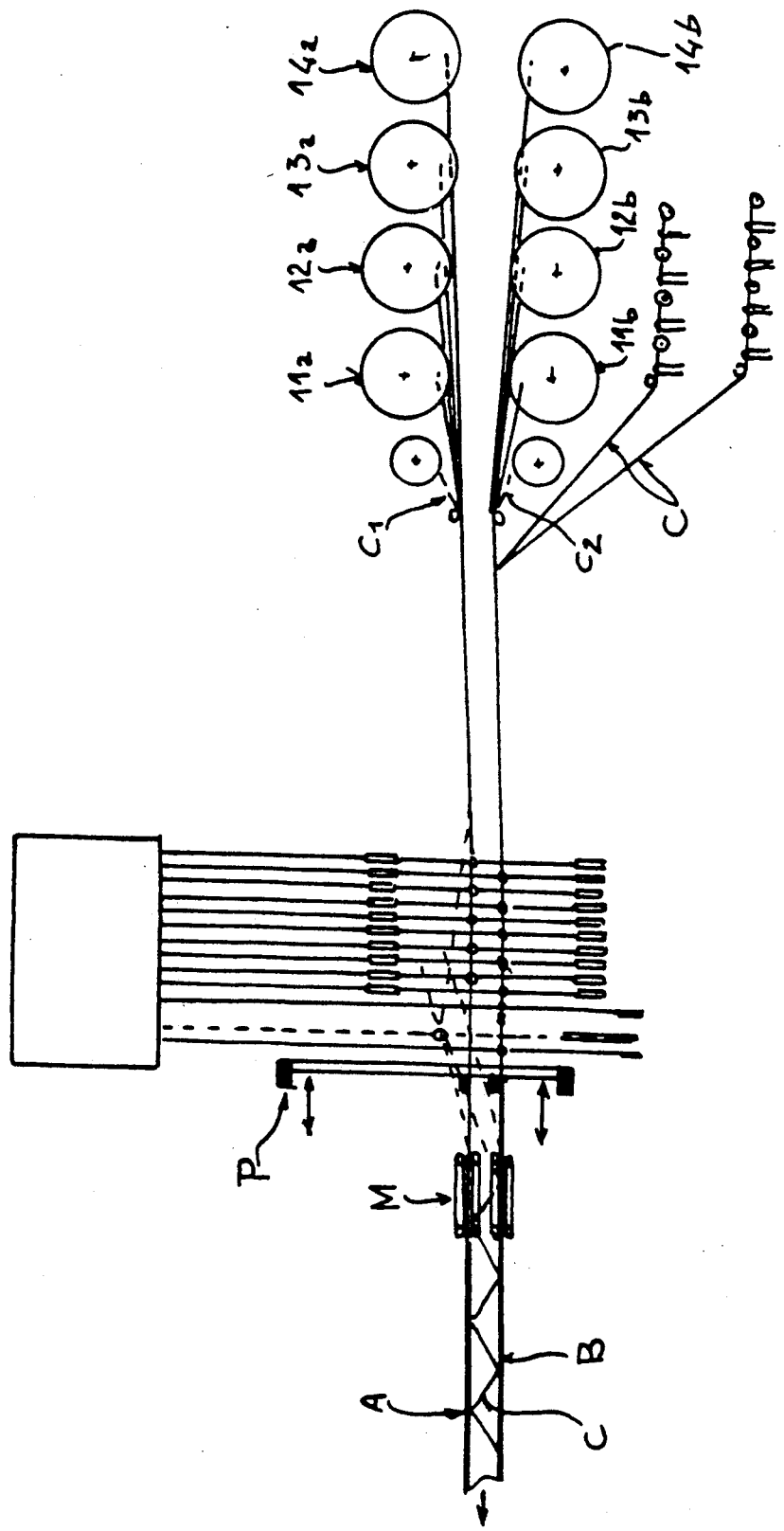
FIG. 9 is a schematic diagram of a weaving loom for producing produce fabrics according to the invention.

The fabrics A, B are preferably produced by a method similar to the method taught by FR-A-2,497,839 and, as is clear from FIG. 8, are formed from laps of warp threads (11a, 12a, 13a, 14a), (11b, 12b, 13b, 14b) and laps of weft threads (15a, 16a, 17a, 18a), (15b, 16b, 17b, 18b) superposed in parallel planes, these threads not being interlaced, and the upper lap and lower lap of the stack consisting of weft laps. The third dimentions of the fabrics formed by warp binding threads (C1, C2) passing through the stack of laps mentioned above, these binding threads moreover passing a round the weft threads so as to form a conventional fabric trapping the inner warp and weft laps.

According to the invention, the connection between the two fabrics A, B is made by means of a series of additional warp binding threads C which alternately bind with the fabrics A, B, the weave of the binding warp being determined as a function of the inclination at which the threads extend in the wall C.

Such material is produced on a conventional weaving loom designed, on the one hand, to allow the two woven laps A, B to be produced separately from one another and, on the other hand, to ensure that the fabric formed maintains its shape after production. The two outer fabrics A, B are manufactured by a method similar to that taught in FR-A-2,497,839 (page 6, lines 5 to 18) and therefore will not be described in detail for the sake of simplification. In contrast, to obtain a connecting wall C having a great height, a binding warp C fed from a creel with individual bobbins is used, these warp threads preferably being controlled by the same mechanism which controls the warp threads of the two fabrics A, B. The adaptations making it possible to produce a fabric according to the invention include a comb P which is moved parallel to the plane of formation of the fabrics A, B and, the provision, downstream of the comb, of a fabric-holding device M which ensures the guidance and advance of the upper lap A and lower lap B.

Figure 6:
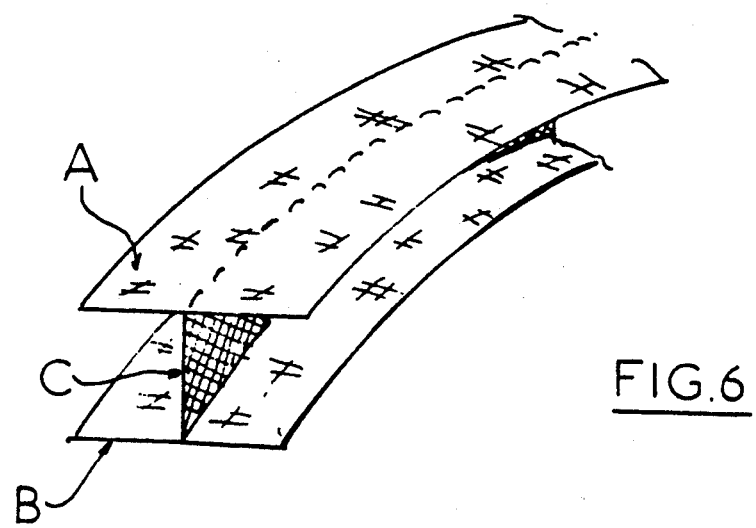
Figure 7:
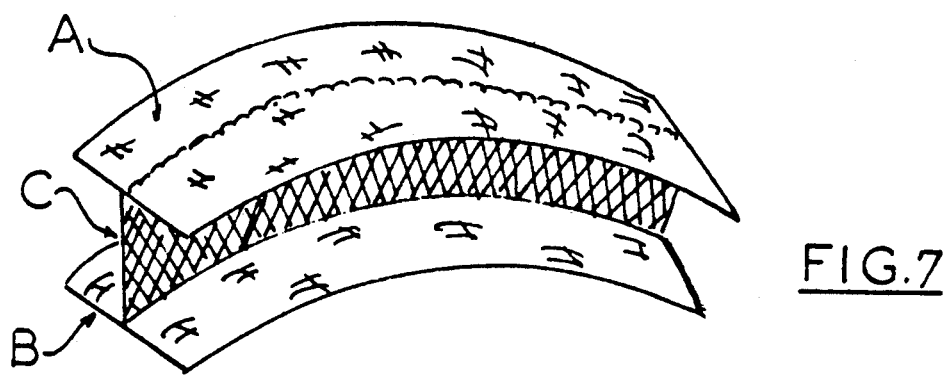

Moreover, as is clear from FIGS. 6 and 7, it is also possible, according to the invention, to obtain a textile structure which not only has a cross section in the form of an I, T, J, etc., but is also curvilinear and has a radius of curvature obtained by acting on the delivery of the warp threads.

In comparison with the prior art, especially that disclosed in FR-A-2,497,839, the invention provides many advantages including:
the possibility of obtaining an H-shaped, I-shaped or T-shaped material having of large dimensions, since the desired form can be produced directly over the entire width of the loom, and this material can also have a very large thickness;
the fact that it is possible to have very good mechanical characteristics, while at the same time a reduced mass of threads in the central part, because in this zone the binding threads can be inclined as desired;
moreover, the finished articles are not subject to delamination, because of the connection between the various layers, and offer very high resistance to shocks;
finally, by virtue of its design, it is possible to produce structures having mixtures of fibers selected according to the characteristics desired of a given part of the material, and, as stated above, having high flexibility throughout the thicknesses, width etc. of the various parts of the structure.

We claim:

1. Laminated material comprising an impregnated reinforcing textile structure, said structure including two woven laps spaced from one another and a connector extending between said two woven laps and maintaining said two woven laps spaced apart, each of said spaced-apart woven laps comprising a plurality of layers of warp threads, a plurality of layers of weft threads and a woven lap warp binding thread binding said plurality of layers together, and said connector consisting of at least one layer of only warp binding threads extending around, in the direction of the warp of said spaced-apart woven laps, and binding the weft threads of said two spaced-apart woven laps thereby connecting said two spaced-apart woven laps.

2. Laminated material as claimed in claim 1, wherein the warp binding threads of said connector extend at right angles to said two woven spaced-apart laps.

3. Laminated material as claimed in claim 1, wherein the warp binding threads of said connector are inclined relative to said two woven spaced-apart laps.

4. Laminated material as claimed in claim 1, wherein a portion of the warp binding threads of said connector extend at right angles to said two woven spaced-apart laps, and the remainder of the warp binding threads of said connector are inclined relative to said two woven spaced-apart laps.

5. Laminated material as claimed in claim 1, wherein the threads are industrial threads exhibiting high mechanical resistance and/or fire resistance.

6. Laminated material as claimed in claim 1, wherein the threads comprise the same material.

7. Laminated material as claimed in claim 1, wherein the threads of said woven laps and the threads of said connector comprise different materials.

8. Laminated material as claimed in claim 7, wherein said woven laps and/or said warp binding threads comprise a mixture of filaments exhibiting high mechanical resistance and/or fire resistance.

9. Laminated material as claimed in claim 1, wherein at least some of the threads of said woven laps and/or said connector have a core exhibiting high mechanical resistance covered or impregnated with a thermoplastic resin.

10. Laminated material as claimed in claim 9, wherein said at least some of the threads comprise carbon or aramide.

11. Laminated material comprising an impregnated reinforcing textile structure, said structure including two woven laps spaced from one another and a connector extending between said two woven laps and maintaining said two woven laps spaced apart, each of said two spaced-apart woven laps comprising at least one layer of warp threads, a respective layer of weft threads associated and non-interlaced with each said at least one layer of warp threads, and a woven lap binding thread binding said at least one layer of warp threads and the respective layer of weft threads associated therewith, said connector consisting of at least one layer of warp binding threads extending around, in the direction of the warp of said spaced-apart woven laps, embedded between and binding the weft threads of said two spaced-apart woven laps thereby connecting said two spaced-apart woven laps.

12. Laminated material as claimed in claim 11, wherein each of said two spaced-apart woven laps comprises a plurality of layers of said warp threads, and a plurality of layers of said weft threads respectively associated and non-interlaced therewith.

13. Laminated material as claimed in claim 12, wherein the lap binding thread extends in the direction of said warp threads and circumvents said weft threads.

14. Laminated material as claimed in claim 9, wherein said at least some of the threads are impregnated or covered with aramide.

15. Laminated material as claimed in claim 1, wherein said threads contain a resin or a polymer.

16. Laminated material as claimed in claim 15, wherein said threads are impregnated with resin, said resin capable of cold or hot reaction.

17. Laminated material as claimed in claim 1, wherein said textile structure previously included reinforcing threads capable of being melted by hot-melting.

18. Laminated material as claimed in claim 1, wherein said connector intersects said woven laps at respective locations defined thereon, and the threads of at least one of said woven laps extend in said at least one of said woven laps across said location, respectively.

19. Laminated material as claimed in claim 11, wherein the warp binding threads of said connector extend at right angles to said two woven spaced-apart laps.

20. Laminated material as claimed in claim 11, wherein the warp binding threads of said connector are inclined relative to said two woven spaced-apart laps.

21. Laminated material as claimed in claim 11 a portion of the warp binding threads of said connector extend at right angles to said two woven spaced-apart laps, and the remainder of the warp binding threads of said connector are inclined relative to said two woven spaced-apart laps.

22. Laminated material as claimed in claim 11, wherein the threads are industrial threads exhibiting high mechanical resistance and/or fire resistance.

23. Laminated material as claimed in claim 11, wherein the threads comprise the same material.

24. Laminated material as claimed in claim 11, wherein the threads of said woven laps and the threads of said connector comprise different materials.

25. Laminated material as claimed in claim 24, wherein said woven laps and/or said warp binding threads comprise a mixture of filaments exhibiting high mechanical resistance and/or fire resistance.

26. Laminated material as claimed in claim 11, wherein at least some of the threads of said woven laps and/or said connector have a core exhibiting high mechanical resistance covered or impregnated with a thermoplastic resin.

27. Laminated material as claimed in claim 26, wherein said at least some of the threads comprise carbon or aramide.

28. Laminated material as claimed in claim 26, wherein said at least some of the threads are impregnated or covered with aramide.

29. Laminated material as claimed in claim 11, wherein said threads contain a resin or a polymer.

30. Laminated material as claimed in claim 29, wherein said threads are impregnated with resin, said resin capable of cold or hot reaction.

31. Laminated material as claimed in claim 11, wherein said textile structure previously included reinforcing threads capable of being melted by hot-melting.

32. Laminated material as claimed in claim 11, wherein said connector intersects said woven laps at respective locations defined thereon, and the threads of at least one of said woven laps extend in said at least one of said woven laps across said location, respectively.

* * * * *